United States Patent
Fedyk et al.

(10) Patent No.: US 7,283,477 B1
(45) Date of Patent: Oct. 16, 2007

(54) ALLOCATING NETWORK RESOURCES

(75) Inventors: Donald Fedyk, Groton, MA (US); Bilel Jamoussi, Nashua, NH (US); Peter Ashwood-Smith, Quebec (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 693 days.

(21) Appl. No.: 09/645,186

(22) Filed: Aug. 24, 2000

(51) Int. Cl.
   *H04J 1/16* (2006.01)
(52) U.S. Cl. .................. 370/237; 370/389; 709/235
(58) Field of Classification Search ........ 370/229–238, 370/254, 468, 389, 255, 239, 241, 351, 400, 370/401, 465, 466, 236, 252; 709/238–241, 709/228, 235
   See application file for complete search history.

(56) References Cited

U.S. PATENT DOCUMENTS

| | | | | |
|---|---|---|---|---|
| 5,233,604 A | * | 8/1993 | Ahmadi et al. | 370/238 |
| 5,600,638 A | * | 2/1997 | Bertin et al. | 370/351 |
| 5,687,167 A | * | 11/1997 | Bertin et al. | 370/254 |
| 5,940,372 A | * | 8/1999 | Bertin et al. | 370/238 |
| 6,034,946 A | * | 3/2000 | Roginsky et al. | 370/238 |
| 6,295,294 B1 | * | 9/2001 | Odlyzko | 370/389 |
| 6,295,453 B1 | * | 9/2001 | Desgagne et al. | 455/448 |
| 6,363,319 B1 | * | 3/2002 | Hsu | 701/202 |
| 6,430,154 B1 | * | 8/2002 | Hunt et al. | 370/230.1 |
| 6,477,582 B1 | * | 11/2002 | Luo et al. | 709/241 |
| 6,529,963 B1 | * | 3/2003 | Fredin et al. | 710/1 |
| 6,574,195 B2 | * | 6/2003 | Roberts | 370/235 |
| 6,608,815 B1 | * | 8/2003 | Huang et al. | 370/232 |
| 6,665,273 B1 | * | 12/2003 | Goguen et al. | 370/252 |
| 6,778,535 B1 | * | 8/2004 | Ash et al. | 370/395.21 |
| 6,912,232 B1 | * | 6/2005 | Duffield et al. | 370/468 |
| 2002/0156914 A1 | * | 10/2002 | Lo et al. | 709/238 |

FOREIGN PATENT DOCUMENTS

WO    WO 98/51041    11/1998

OTHER PUBLICATIONS http://www.ietf.org/internet-drafts/draft-ietf-mpls-arch-06.txt, "Multiprotocol Label Switching Architecture," visited May 11, 2000.
http://www.networkmagazine.com/magazine/archive/1999/11/9911tech5.htm, "MPLS: A Progress Report," visited May 11, 2000.
Stephen E. Deering and David R. Cheriton, "Multicast Routing in Datagram Internetworks and Extended LANs", ACM Transactions on Computer Systems, vol. 8, No. 2, May 1990, pp. 85-110, New York.
European Search Report.

* cited by examiner

*Primary Examiner*—John Pezzlo
(74) *Attorney, Agent, or Firm*—Guerin & Rodriguez, LLP

(57) ABSTRACT

A network resource is allocated to a data path by determining if a sufficient amount of the network resource is available in a network path to accommodate the data path, and obtaining a cost associated with using the network resource available in the network path for the data path. It is decided whether to allocate the network resource in the network path to the data path based on the amount of the network resource and the cost associated with using the network resource. One representative example of the data path is a label switched path (LSP) on a multiprotocol label switching (MPLS) network.

20 Claims, 3 Drawing Sheets

ALLOCATING NETWORK RESOURCES

BACKGROUND

This invention relates generally to allocating a network resource, such as bandwidth, to a data path.

An MPLS (MultiProtocol Label Switching) network forwards data packets through data paths, called label switched paths (LSPs), that are configured between source and destination devices. LSPs may experience different amounts of packet traffic load, thereby requiring different amounts of bandwidth.

Traditional MPLS routers "blindly" configure LSPs on network paths that have the fewest number of hops. Consequently network congestion may result, even though there is available bandwidth on other network paths with greater numbers of hops.

SUMMARY OF THE INVENTION

In general, in one aspect, the invention is directed to allocating a network resource to a data path. This aspect of the invention features determining if a sufficient amount of the network resource is available in a network path to accommodate the data path, and obtaining a cost associated with using the network resource available in the network path for the data path. It is decided whether to allocate the network resource in the network path to the data path based on the amount of the network resource and the cost associated with using the network resource. One representative example of the data path is an LSP on an MPLS network.

This aspect of the invention may include one or more of the following features. The network resource is bandwidth. Deciding whether to allocate the network resource includes comparing the cost to a predetermined maximum acceptable cost. The cost includes a number of hops on the network path between a source and a destination on the network. The number of hops is obtained by reference to a topology database for determining a path between the source and the destination.

This aspect may also include allocating, to the data path, the network resource available in the network path if (i) the cost is at or below the predetermined maximum acceptable cost, and (ii) there is enough of the network resource available in the network path to accommodate the data path. If it is decided not to allocate the network resource available in the network path to the data path, determining, obtaining and deciding are repeated by substituting a network resource available to an Nth (N>2) network path for the network resource available to the network path.

Determining if enough of the network resource is available in the network path to accommodate the data path includes determining an amount of the network resource that is available on the network path but that is not used by existing data packets on the network path, and comparing an amount of the network resource needed by the data path to the amount of the network resource that is available on the network path but that is not used by the existing data packets.

The data path has a predetermined priority level and deciding whether to allocate the network resource to the data path takes into account the predetermined priority level of the data path. At least a portion of the network resource in the network path that is being used by a data path at a different priority level from the predetermined priority level is taken to accommodate the data path at the predetermined priority level. The predetermined priority level is a higher priority level than the different priority level.

In general, in another aspect, the invention is directed to configuring an LSP through an MPLS network. This aspect of the invention features determining if there is sufficient unused bandwidth on a network path to accommodate the LSP, and allocating the unused bandwidth of the network path to the LSP if there is sufficient unused bandwidth available.

This aspect of the invention may feature one or more of the following. A cost associated with using the unused bandwidth on the network path for the LSP is obtained and allocating includes using the unused bandwidth if the cost is below a predetermined maximum cost. The cost includes a number of hops associated with the network path between a source and a destination on the MPLS network.

Determining if there is sufficient unused bandwidth includes successively checking plural other network paths to determine which one, if any, of the plural other network paths has sufficient unused bandwidth available to accommodate the LSP. The LSP has a predetermined priority level and allocating the unused bandwidth to the LSP takes into account the predetermined priority level of the LSP. Allocating the unused bandwidth includes taking at least a portion of the bandwidth in the network path that is being used by an LSP at a different priority level from the predetermined priority level for use by the LSP at the predetermined priority level. The predetermined priority level is a higher priority level than the different priority level.

Other features and advantages of the invention will become apparent from the following description and drawings.

DETAILED DESCRIPTION

Figure 1:
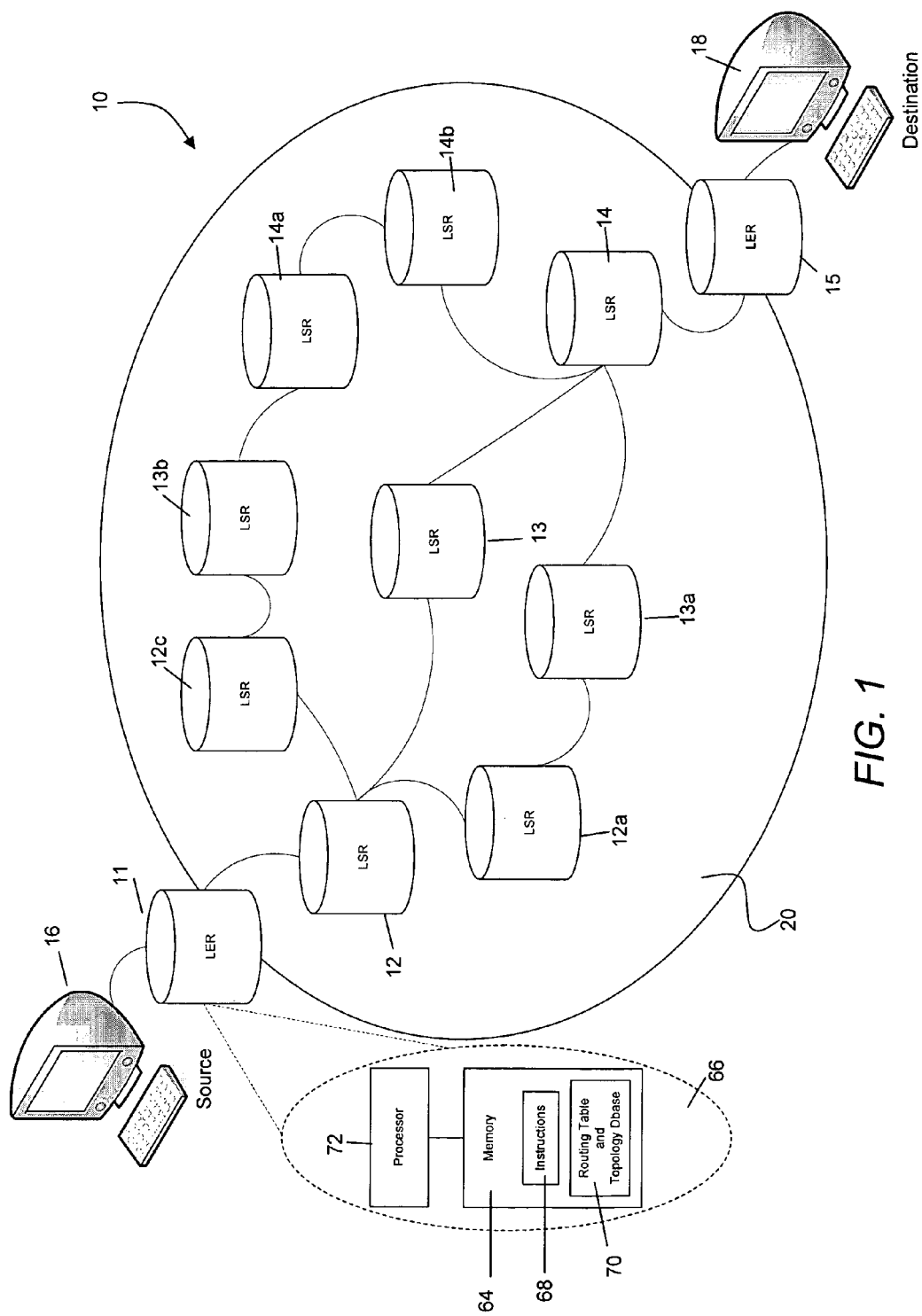
FIG. 1 is a block diagram of a network on which an embodiment of the invention is implemented.

Referring to FIG. 1, a network 10 is shown. Network 10 includes routers 11 to 15, source device 16, destination device 18, and MPLS domain 20. Typically, IP (Internet Protocol) is used to transfer data packets outside of MPLS domain 20, although other suitable protocols may be used. The MPLS protocol is used to transfer data packets through MPLS domain 20.

The MPLS Protocol

MPLS data flow resembles circuit switching. In this respect, MPLS is similar to the asynchronous transfer mode (ATM) protocol. MPLS is frame-based, however, rather than cell-based like ATM. MPLS encapsulates data packets of different protocols with a "label" that is routed through an MPLS network irrespective of the protocol of the data packet that is encapsulated. Labels are switched at each forwarding hop between a source and destination on the MPLS network.

A label is a number that uniquely identifies a set of data flows on a particular link or within a particular logical link. Labels are of local significance only, meaning that the labels change as data packets follow an LSP (i.e., a data path), hence the "switching" part of MPLS. MPLS can switch a frame from any type of transfer protocol, i.e., "layer 2" link, to any other kind of "layer 2" link without relying on any particular control protocol to perform the switching.

Figure 2:
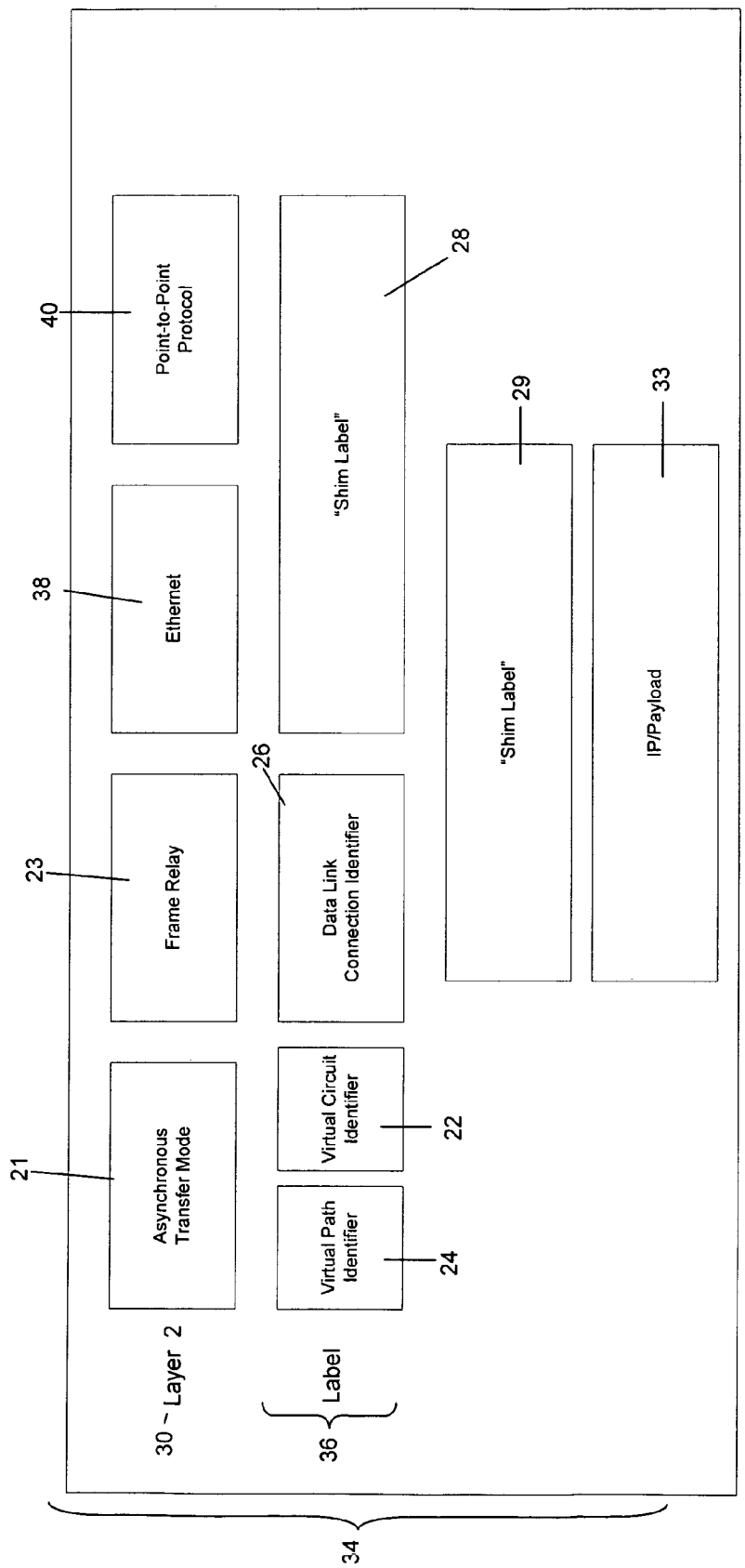
FIG. 2 is a block diagram showing MPLS labeling.

Referring to FIG. 2, MPLS supports three different types of labels. On ATM link 21, MPLS uses the Virtual Circuit Identifier (VCI) label 22 and a Virtual Path Identifier (VPI) label 24. On frame relay links 23, MPLS uses a Data Link Connection Identifier (DLCI) label 26. In other technologies, MPLS uses a, generic label called "Shim" 28, which is between layer 2 (30) and layer 3 (33) of protocol stack 34.

In operation, an MPLS-compliant router receives a label-encapsulated data packet on any of its interfaces, looks up the label in a switching table inserts a new label of the appropriate format, and sends the packet out of the appropriate router interface with the new label. Thus, an MPLS-compliant router can switch a labeled packet from any interface to any other interface with a new label.

As shown in FIG. 2, MPLS supports an arbitrary number of labels in a label stack 36, where the bottom-most label carries a specific bit identifying it as the bottom label of the stack. On Point-to-Point Protocol (PPP) links 40 or LAN media 38, "Shim" labels 28, 29 are used for all levels. Because MPLS can support a label stack regardless of how many labels are in the stack, it can support applications such as a virtual private network (VPN) on a tunnel or stacked tunnels.

An LSP is a predefined data path through an MPLS domain. An LSP is defined by an ingress point and an egress point of the MPLS domain, each of which contains an LER. A single MPLS domain may contain several LSPs. For example, MPLS domain 20 may contain three LSPs, one of which is configured over routers/network path 12-13-14, another of which is configured over routers/network path 12-12c-13b-14a-14b-14, and another of which is configured over routers/network path 12-12a-13a-14. A single network path may contain more than one LSP. For example, routers/network path 12-13-14 may contain several LSPs, even though only one is described here. The routers support bandwidth reservation, bandwidth prioritization, traffic engineering, traffic shaping, traffic policing, tunneling, and QoS (Quality of Service) on various types of interfaces, on a path made up of any sequence of LSPs.

There are two types of MPLS routers, which are defined by their functionality and placement in an MPLS network: Label Switching Routers (LSRs) and Label Edge Routers (LERs). A router running MPLS at the edge of an MPLS domain 20 is an LER (routers 11 and 15) and those routers within an MPLS domain are LSRs. An LER places traffic on an LSP by performing a single routing operation. The next hop for the destination is the first label and link for the LSP. The routing operation can be simple or complex because it is performed only once at the head of the LSP. This means that any policy the LER uses to decide which traffic to put onto an LSP needs to be implemented only in the LER. The LSRs need not know the complex mapping of traffic that may be occurring at the edge of the MPLS domain and, therefore, require neither additional provisioning nor any additional hardware or software to support the LER's requirements.

MPLS uses a Forwarding Equivalence Class (FEC). The FEC enables the MPLS protocol to map traffic to an LSP in a variety of ways. Two packets are considered to be in the same FEC if they are to be routed along the same path. MPLS supports mappings on arbitrary bit-length IP address prefixes or full 32-bit host IP addresses. More complex mappings are possible with explicitly routed control protocols, such as Constraint-based Routed Label Distribution Protocol (CR-LDP) and Extended Resource Reservation Protocol (RSVP). This is because mappings are made locally within a router, switch, or other such device and need not be considered by other devices along the control path.

To establish an MPLS network, including LSPs, between two peers (network devices, such as LSRs), Label Distribution Protocol (LDP) and CR-LDP are used. These control protocols begin with a neighbor discovery phase based on a UDP (Uniform Datagram Protocol) "hello" packet. Once received, the peer LDP/CR-LDP protocol will respond with a UDP "hello" packet, at which point a TCP/IP communication channel is opened between the two peers to handle a particular label space. The two network devices then exchange initialization information, including the desired protocol version, operating modes, time-out values, label ranges, and types supported.

Once both devices have agreed on a common subset of operating parameters, the label space is deemed usable and labels may be allocated. A continuous, low-frequency, "keep-alive" packet is sent over the TCP/IP (Transmission Control Protocol/Internet Protocol) connection to make sure that the TCP/IP connection is still working in the absence of other control traffic. If too much time passes before a control message is received, the TCP/IP connection is terminated. Upon detecting a failure (either a time-out or layer-2 error), LDP releases any allocated labels and sends appropriate messages to peer LSRs in the MPLS network so that the peer LSRs can terminate their sessions.

LDP deals primarily with duplicating destination-based trees that IP uses for forwarding purposes. LDP transforms these trees into label-switching trees.) OSPF (Open Shortest Path First) and IS-IS (Intermediate System to Intermediate System) protocols compute and distribute a Shortest Path First (SPF) tree for a destination from a source. A topology database, from which the SPF tree is determined, is stored in an LER for the MPLS network (e.g., the LER closest to the source device) or it may be stored on LSRs in the network. The SPF tree, however determined, is copied by LDP, which allocates a label on a link to a given destination. This repeated for every link in the SPF tree.

In normal IP, each router along a path examines a packet's destination and chooses a new link. With LDP, the packet follows the same path it would with normal IP; however, the packet is assigned a label and link when it is first routed. When the packet arrives at its next hop, its label is substituted with the next label along the SPF tree toward the destination. The LSR contains an IP forwarding table that stores data specifying the next hop and the next label for the packet. The data in the forwarding table is keyed to the packet's current label. The packet is then sent to the next hop, where label substitution continues until the destination is reached. In this manner, the packet follows the same path it would with normal IP, but its IP header is not examined. In fact, any packet placed on the LSP would end up at the destination, regardless of its protocol, hence the "multiprotocol" part of MPLS. The protocol being encapsulated may be IP, although the addresses in the IP header may or may not mean anything to the intermediate LSRs, since these addresses may be private.

LDP can copy the SPF tree for a given destination in several ways. In its simplest form, LDP will allocate a label for every destination it can reach, then tell every MPLS peer the destination and label. These messages are called mapping messages, and every MPLS-capable router sends and receives them. The MPLS router will eventually learn what labels reach which destinations and which labels it has given out to reach which destinations. To behave as an LSR, an MPLS router is programmed to switch between the labels it has given and the labels it has received.

In this manner, IP forwarding tables in the router are turned into a label-switched set of trees. All of this can be accomplished using mapping messages. Such "blind" distribution of labels, however, may exhaust the label space, especially on hardware where label space is limited. This problem is addressed by "On Demand" modes, which allocate labels on demand. That is, an MPLS router asks for a label when it wants one and gives out a label mapping when asked to do so (via a request message). The most useful of these LDP modes, "Down-Stream-On-Demand", does not allocate a label to a destination until requested to do so, and it will not reply to that request until it has received a label from its downstream peer. These requests may merge with a completed or pending upstream request. In the "Down-Stream-On-Demand" mode, LDP can only follow the IP forwarding tables. To address this shortcoming, an extension to LDP, CR-LDP, is used. With CR-LDP, a request for a label does not blindly follow the SPF tree for a given destination. Instead, the request is told what route to follow by embedding an explicit route (or source route) in the request. When the LDP/CR-LDP software receives one of these requests, it does not use the IP forwarding table to route the request, as LDP would do.

Allocating Bandwidth in an MPLS Network

Figure 3:
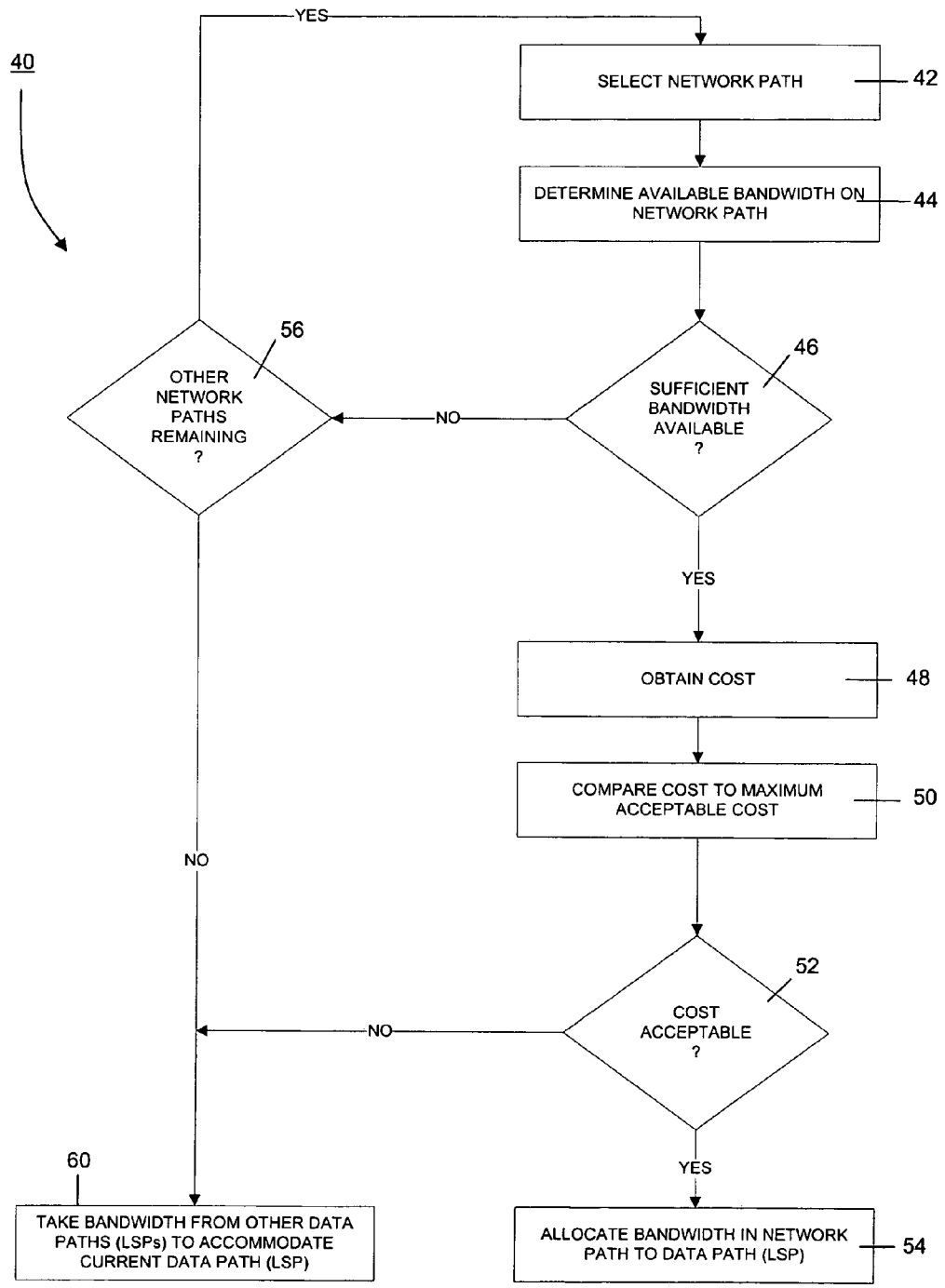
FIG. 3 is a flowchart showing a process for allocating bandwidth in the network of FIG. 1.

Referring to FIG. 3, a process 40 is shown for allocating bandwidth to configure LSPs over MPLS domain 20. Process 40 provides a way to distribute LSPs over different network paths or "links" on an MPLS network. As used herein, a network path includes a string of routers, switches, or other packet forwarding devices in MPLS domain 20. Distributing LSPs over different network paths reduces packet congestion that can result if, e.g., too many LSPs are configured over the network path with the fewest number of hops.

Process 40 runs on LER 11, since LER 11 is the closest LER to source device 16. Process 40 selects (42) a network path through MPLS domain 20 based, e.g., on the number of hops in the network path. The number of hops is determined by reference to the SPF tree derived from the topology database stored in memory 64 of LER 11. The network path with the least number of hops is typically selected first. In network 10 of FIG. 1, the network path with the least number of hops includes LSRs 12-13-14.

Process 40 determines (44) if there is enough unused bandwidth available on the selected network path to accommodate an LSP and its associated data packet flow. "Accommodate" here can refer to any data-transfer parameter, such as a desired bitrate or QoS. "Unused" bandwidth refers to bandwidth that is not currently being used to transfer data packets on the selected network path.

Process 40 determines if there is enough available bandwidth on the selected network path by determining the total amount of available bandwidth on the selected network path and then determining the amount of bandwidth that is not currently in use. The amount of bandwidth on the selected network path and the amount of bandwidth not currently in use may be stored in LER 11 and/or it may be obtained by querying the individual LSRs that make up the network path, namely LSRs 12-13-14. Process 40 compares the amount of bandwidth that is needed by the LSP to the amount of unused bandwidth available on the selected network path. In this way, process 40 determines if there is sufficient bandwidth to accommodate the LSP and its associated data packets.

If process 40 determines that the selected network path contains sufficient bandwidth to accommodate the LSP (46), process 40 obtains (48) the cost associated with using the bandwidth from the selected network path. "Cost", in this context, refers to the number of hops on the selected network path. In this case, there are three hops, with each of routers 12, 13 and 14 constituting a hop. As noted above, the number of hops (i.e., the cost) is obtained by referencing the topology database maintained in LER 11. The network path is mapped in the topology database to determine the number of hops between source and destination devices.

Process 40 decides (50, 52, 54) whether to allocate bandwidth available in the selected network path to the LSP based on the cost and on whether there is sufficient available bandwidth to accommodate LSP. This includes comparing (50) the cost to a maximum acceptable cost. The maximum acceptable cost may be pre-programmed into LER 11 or it may be obtained from source device 16.

If the cost is acceptable (52), meaning that the cost is at or below the maximum acceptable cost, process 40 allocates (54) the unused/available bandwidth from the selected network path to the LSP. Allocation (54) is performed without substantially interfering with existing traffic on devices comprising the selected network path. The LSP is configured over MPLS domain 20 using the allocated bandwidth.

In process 40, if there is not enough bandwidth available on the selected network path to accommodate the LSP (46), process 40 returns to 42, provided that that there are other network paths in MPLS domain 20 (56). Process 40 selects (42) another network path. For example, process 40 selects the network path in MPLS domain 20 that has the "next" least number of hops. In this example, that network path includes LSRs 12-12a-13a-14. Process 40 repeats 44 to 46 for this newly-selected network path. If process 40 determines (46) that there is not enough bandwidth available on this newly-selected network path to accommodate the LSP, process 40 returns to 42, where the next network path (i.e., the network path that includes routers 12-12c-13b-14a-14b-14) is selected. Process 40 is repeated, selecting network paths consecutively based on the number of hops in the network paths, until an acceptable network path is found for the LSP or until it is determined that the cost is unacceptable.

If the cost is determined to be unacceptable (52) or there is not enough available bandwidth on any network paths (46, 56), the LSP may be configured in the network path having the most amount of unused bandwidth and/or the least amount of hop. It may be necessary, in this case, for the LSP to take (60) bandwidth away from LSPs that are already on the network path. This is especially true where the new LSP has a higher priority level than LSPs that are already on that path.

In this regard, LSPs may be assigned a priority level based on the source device from which they originated. For example, LSPs may have priority levels of "0", "60", "90" and "100", with "0" being the lowest priority, "60" being the next highest priority, "90" being the next highest priority, and "100" being the highest priority. Process 40 may take into account the priority levels of LSPs when taking bandwidth for the LSP from devices on a network path.

Process 40 determines the priority level of the LSP based on stored information in the LSRs/LERs and/or by transmitting data packets through the LSPs (i.e., signaling). Once the priority level has been determined, process 40 is executed in the manner described above. The difference here is that process 40 takes into account the priority level of the LSP when determining how to allocate bandwidth in a selected network path. That is, if process 40 needs to take

(60) bandwidth away from an existing LSP, process 40 does so based on the level of priority of the new and existing LSP.

So, if the network path with the fewest number of hops is being used by an LSP with a low priority and the new LSP has a higher priority, process 40 takes bandwidth away from the old LSP for use by the new LSP. The data packets that were on the old LSP may be lost or queued for later transmission and a message may be sent to the corresponding source device indicating a termination and/or interruption of network services. The lower priority LSP may be torn down and is re-established by process 40 if it is to be used again.

On the other hand, if the network path with the fewest number of hops is being used by an LSP that has a higher or equal priority than the new LSP, process 40 checks through the remaining network paths until it finds enough bandwidth, an acceptable cost, or LSPs that have a lower priority than the new LSP. It is from these network paths that bandwidth is taken, if available. If the new LSP has the lowest priority of any LSPs in current use on the network, the new LSP will not be configured and a message will be sent to the source device indicating that there are not sufficient network resources currently available to accommodate the new LSP.

Process 40 may attempt to set up higher priority LSPs. When messages are sent to the LSRs in the MPLS network, it is possible that there is not sufficient bandwidth due to processing inaccuracies. In this case, a failure indication is sent and the search for a new network path continues, excluding any network paths that have failed.

Process 40 is implemented in LER 11 (FIG. 1), which may be a router, or any other type of network device. LER 11 includes a memory 64 (see view 66), which stores computer-executable instructions 68 to implement process 40, the MPLS and LDP protocols described above, OSPF, RIP, IS-IS, TCP/IP, and any other protocols necessary for communicating over network 10. Memory 64 also stores IP routing/forwarding tables and topology database 70. LER 11 also includes a processor 72, which executes instructions 68 to perform process 40.

Process 40, however, is not limited to use with any particular hardware or software configuration; it may find applicability in any computing or processing environment. Process 40 may be implemented in hardware (e.g., an ASIC {Application-Specific Integrated Circuit} or programmable logic such as an FPGA {Field Programmable Gate Array}), software, or a combination of hardware and software.

Process 40 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 40 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 40. Process 40 may also be implemented as a computer-readable storage medium, configured with a computer program, where, upon execution, instructions in the computer program cause the computer to operate in accordance with process 40.

Other embodiments not described herein are also within the scope of the following claims. For example, process 40 can be used to allocate network resources other than bandwidth. Process 40 can select network paths in a random order instead of selecting network paths consecutively based on the number of hops contained in those paths. In this case, a feedback path would be provided from 52 to 42 in FIG. 3, and the path from 52 to 60 would be eliminated. Process 40 can be used with protocols other than TCP/IP and those others mentioned above. Process 40 can be used with networks other than MPLS and is not limited to networks that route data packets using an encapsulation or other labeling scheme.

It is to be understood that while the invention has been described in conjunction with the detailed description thereof, the foregoing description is intended to illustrate and not limit the scope of the invention. Aspects, advantages and modifications not described herein are also within the scope of the following claims.

What is claimed is:

1. A method for allocating a network resource to a data path associated with a data packet flow and having a predetermined priority, the method comprising:

evaluating one or more network paths between a source and a destination until one network path is found with sufficient unused network resource available for supporting the data packet flow of the data path and with at most an acceptable maximum number of hops, or until no such network path is found;

if one network path is found with sufficient unused network resource available for supporting the data packet flow of the data path and with at most an acceptable maximum number of hops, configuring the data path on the one network path and allocating a sufficient portion of the unused network resource to the data path to support the data packet flow associated therewith; and if no network path is found with sufficient unused network resource available for supporting the data packet flow of the data path and with at most an acceptable maximum number of hops, selecting a network path between the source and the destination having the most unused network resource of the network paths between the source and the destination, configuring the data path on the selected network path, and taking network resource from an existing data path on the selected network path having a priority lower than the predetermined priority of the data path in order to allocate sufficient network resource to the data path to support the data packet flow associated therewith.

2. The method of claim 1, wherein the network resource comprises bandwidth.

3. The method of claim 1, wherein a number of hops for a given network path is obtained by reference to a topology database for determining a path between the source and the destination.

4. The method of claim 1, wherein the data path comprises a label switched path (LSP) on a multiprotocol label switching (MPLS) network.

5. A method of configuring a label switched path (LSP) through a multiprotocol label switching (MPLS) network, the LSP having an associated data packet flow and a predetermined priority, the method comprising:

evaluating one or more network paths in the MPLS network between a source and a destination until one network path is found with sufficient unused network resource available for supporting the data packet flow of the LSP and with at most an acceptable maximum number of hops, or until no such network path is found;

if one network path in the MPLS network is found with sufficient unused network resource available for supporting the data packet flow of the LSP and with at most an acceptable maximum number of hops, configuring the LSP on the one network path and allocating a sufficient portion of the unused network resource to the LSP to support the data packet flow associated therewith; and if no network path in the MPLS network is found with sufficient unused network resource available for supporting the data packet flow of the LSP and with at most an acceptable maximum number of hops, selects a network path between the source and the destination having the most unused network resource of the network paths between the source and the destination, configures the LSP on the selected network path, and takes network resource from an existing LSP on the selected network path having a priority lower than the predetermined priority of the LSP in order to allocate sufficient network resource to the LSP to support the data packet flow associated therewith.

6. The method of claim 5, wherein a number of hops for a given network path is obtained by reference to a topology database for determining a path between the source and the destination.

7. A computer program stored on a computer-readable medium for allocating a network resource to a data path associated with a data packet flow and having a predetermined priority, the computer program comprising instructions that cause a processor to:

evaluate one or more network paths between a source and a destination until one network path is found with sufficient unused network resource available for supporting the data packet flow of the data path and with at most an acceptable maximum number of hops, or until no such network path is found;

if one network path is found with sufficient unused network resource available for supporting the data packet flow of the data path and with at most an acceptable maximum number of hops, configure the data path on the one network path and allocate a sufficient portion of the unused network resource to the data path to support the data packet flow associated therewith; and if no network path is found with sufficient unused network resource available for supporting the data packet flow of the data path and with at most an acceptable maximum number of hops, select a network path between the source and the destination having the most unused network resource of the network paths between the source and the destination, configure the data path on the selected network path, and take network resource from another data path on the selected network path having a priority lower than the predetermined priority of the data path in order to allocate sufficient network resource to the data path to support the data packet flow associated therewith.

8. The computer program of claim 7, wherein the network resource comprises bandwidth.

9. The computer program of claim 7, wherein a number of hops for a given network path is obtained by reference to a topology database for determining a path between the source and the destination.

10. The computer program of claim 7, wherein the data path comprises a label switched path (LSP) on a multiprotocol label switching (MPLS) network.

11. A computer program stored on a computer-readable medium for configuring a label switched path (LSP) through a multiprotocol label switching (MPLS) network, the LSP having an associated data packet flow and a predetermined priority, the computer program comprising instructions that cause a processor to:

evaluate one or more network paths in the MPLS network between a source and a destination until one network path is found with sufficient unused network resource available for supporting the data packet flow of the LSP and with at most an acceptable maximum number of hops, or until no such network path is found;

if one network path in the MPLS network is found with sufficient unused network resource available for supporting the data packet flow of the LSP and with at most an acceptable maximum number of hops, configure the LSP on the one network path and allocate a sufficient portion of the unused network resource to the LSP to support the data packet flow associated therewith; and if no network path in the MPLS network is found with sufficient unused network resource available for supporting the data packet flow of the LSP and with at most an acceptable maximum number of hops, select a network path between the source and the destination having the most unused network resource of the network paths between the source and the destination, configure the LSP on the selected network path, and take network resource from an existing LSP on the selected network path having a priority lower than the predetermined priority of the LSP in order to allocate sufficient network resource to the LSP to support the data packet flow associated therewith.

12. The computer program of claim 11, wherein a number of hops for a given network path is obtained by reference to a topology database for determining a path between the source and the destination.

13. An apparatus for allocating a network resource to a data path associated with a data packet flow and having a predetermined priority, the apparatus comprising circuitry which:

evaluates one or more network paths between a source and a destination until one network path is found with sufficient unused network resource available for supporting the data packet flow of the data path and with at most an acceptable maximum number of hops, or until no such network path is found;

if one network path is found with sufficient unused network resource available for supporting the data packet flow of the data path and with at most an acceptable maximum number of hops, configures the data path on the one network path and allocates a sufficient portion of the unused network resource to the data path to support the data packet flow associated therewith; and if no network path is found with sufficient unused network resource available for supporting the data packet flow of the data path and with at most an acceptable maximum number of hops, selects one of the network paths having the most unused network resource of the network paths between the source and the destination, configures the data path on the selected network path, and takes network resource from an existing data path on the selected network path having a priority lower than the predetermined priority of the data path in order to allocate sufficient network resource to the data path to support the data packet flow associated therewith.

14. The apparatus of claim 13, wherein the network resource comprises bandwidth.

15. The apparatus of claim 13, wherein a number of hops for a given network path is obtained by reference to a topology database for determining a path between the source and the destination.

16. The apparatus of claim 13, wherein the data path comprises a label switched path (LSP) on a multiprotocol label switching (MPLS) network.

17. The apparatus of claim 13, wherein the circuitry comprises a memory which stores computer instructions and a processor which executes the computer instructions.

18. The apparatus of claim 13, wherein the circuitry comprises one or more of an integrated circuit and programmable logic.

19. An apparatus for configuring a label switched path (LSP) through a multiprotocol label switching (MPLS) network, the LSP having with an associated data packet flow and a predetermined priority, the apparatus comprising circuitry which:
   evaluates one or more network paths in the MPLS network between a source and a destination until one network path is found with sufficient unused network resource available for supporting the data packet flow of the LSP and with at most an acceptable maximum number of hops, or until no such network path is found;
   if one network path in the MPLS network is found with sufficient unused network resource available for supporting the data packet flow of the LSP and with at most an acceptable maximum number of hops, configures the LSP on the one network path and allocates a sufficient portion of the unused network resource to the LSP to support the data packet flow associated therewith; and
   if no network path in the MPLS network is found with sufficient unused network resource available for supporting the data packet flow of the LSP and with at most an acceptable maximum number of hops, selects a network path between the source and the destination having the most unused network resource of the network paths between the source and the destination, configures the LSP on the selected network path, and takes network resource from an existing LSP on that selected network path having a priority lower than the predetermined priority of the LSP in order to allocate sufficient network resource to the LSP to support the data packet flow associated therewith.

20. The apparatus of claim 19, wherein a number of hops for the selected network path is obtained by reference to a topology database for determining a path between the source and the destination.

* * * * *